US009058747B2

(12) United States Patent
Bianco

(10) Patent No.: US 9,058,747 B2
(45) Date of Patent: Jun. 16, 2015

(54) LOCATOR SYSTEM

(75) Inventor: James S. Bianco, Suffield, CT (US)

(73) Assignee: Control Module, Inc., Enfield, CT (US)

( * ) Notice: Subject to any disclaimer, the term of this patent is extended or adjusted under 35 U.S.C. 154(b) by 660 days.

(21) Appl. No.: 13/305,210

(22) Filed: Nov. 28, 2011

(65) Prior Publication Data

US 2012/0139758 A1 Jun. 7, 2012

Related U.S. Application Data

(60) Provisional application No. 61/418,978, filed on Dec. 2, 2010.

(51) Int. Cl.
*G06F 7/04* (2006.01)
*G08G 1/00* (2006.01)
*G08G 1/017* (2006.01)

(52) U.S. Cl.
CPC . *G08G 1/20* (2013.01); *G08G 1/017* (2013.01)

(58) Field of Classification Search
CPC .......................................................... G06F 7/04
USPC .............. 340/933, 438, 439, 937, 988, 425.5; 705/13, 307; 701/29.3, 35, 32.3, 32.6, 701/33.2, 33.4, 300; 455/412.1, 426.1
See application file for complete search history.

(56) References Cited

U.S. PATENT DOCUMENTS

| | | | | |
|---|---|---|---|---|
| 7,123,127 | B2 * | 10/2006 | Mosgrove et al. | 340/5.21 |
| 8,626,568 | B2 * | 1/2014 | Warkentin et al. | 705/7.38 |
| 2008/0106870 | A1 * | 5/2008 | Dully | 361/724 |
| 2008/0125965 | A1 * | 5/2008 | Carani et al. | 701/207 |
| 2009/0312032 | A1 * | 12/2009 | Bornstein et al. | 455/456.1 |
| 2010/0109837 | A1 * | 5/2010 | Sato et al. | 340/5.65 |
| 2011/0039582 | A1 * | 2/2011 | Kendall | 455/456.5 |
| 2014/0071274 | A1 * | 3/2014 | Golden | 348/143 |

* cited by examiner

*Primary Examiner* — Brent Swarthout
(74) *Attorney, Agent, or Firm* — Alix, Yale & Ristas, LLP

(57) ABSTRACT

A locator system employs personal communicators which are carried on or worn in a holster by drivers. The communicators are employed to automatically transmit data for determining the identity of the driver, the identity of the vehicle and date and time stamps when the vehicle enters and exits various detection zones. In one embodiment the detections zones are defined by Bluetooth signals.

22 Claims, 8 Drawing Sheets

LOCATOR SYSTEM

CROSS REFERENCE TO RELATED APPLICATION

This application claims the priority of U.S. Provisional Application No. 61/418,978 filed Dec. 2, 2010, the entirety of which is incorporated herein by reference.

BACKGROUND

This application relates generally to systems and methods for automatically monitoring the travel time and position relative to various locations. More particularly, this application generally relates to a system and a method for automatically determining the travel time of a vehicle between locations and facilitating communications to and from the vehicle driver for control and operation thereof.

SUMMARY

Briefly stated, a method of monitoring the location of a driver and a vehicle comprises providing controlled access to a rack of personal electronic communicators, entering a driver ID and confirming the validity of the driver ID. The driver ID is then entered on a selected communicator. The selected communicator is removed from the rack and placed in a holster worn by the driver. The communicator is used to identify a vehicle driven by the driver. The vehicle is driven from a first zone to a second zone. The exit from the first zone is detected and exit data from the communicator is automatically transmitted to a processor. The entrance into a second zone is detected and entrance data is automatically transmitted from the communicator to the processor. The exit data and entrance data are processed to determine the transit time of the vehicle between the first and second zones.

Each of the first and second zones is preferably defined by Bluetooth signals. The communicator further comprises a GPS and location signals indicative of the location of the vehicle are automatically transmitted from the communicator to the processor. The location signals are automatically sequentially transmitted at pre-established time intervals. The exit data and the entrance data each comprise a date and time stamp, a driver ID and a vehicle ID.

In one embodiment, the print of a user is entered into a bio-reader to confirm authorization for the user of a communicator. The exit of the vehicle from second zone is detected and the second zone exit data is automatically transmitted from the communicator to the processor to determine the time the vehicle is in the second zone. SMS messages are also transmitted to and from the communicator. The exit data and entrance data transmitted from the communicator are undertaken by SMS communication. The communicator is returned to a rack and information concerning the return of the communicator is automatically transmitted.

A method of monitoring the location of a driver and a vehicle comprises controllably accessing a plurality of personal electronic communicators. The driver ID is entered on a selected communicator. A driver takes possession of the selected communicator. The communicator is used to identify the vehicle to be driven by the driver. The vehicle is driven from a first zone to a second zone. The exit from the first zone is automatically detected, and the exit data is automatically transmitted from the communicator to a remote processor. The entrance into the second zone is automatically detected and the entrance data is automatically transmitted from the communicator to the remote processor. Each of the first and second zones is defined by Bluetooth signals. The communicator further comprises a GPS, and location signals are transmitted from the communicator to the remote processor. The location signals are preferably transmitted at pre-established time intervals.

A method of monitoring the location of a driver and a vehicle comprises selecting a personal electronic communicator from a plurality of personal electronic communicators and entering a driver ID on the selected communicator. The selected communicator is released for usage by the driver. The selected communicator is used to identify a vehicle to be driven by the driver. The vehicle is driven from a first zone to a second zone while the driver has the selected communicator. The exit of the vehicle from the first zone is automatically detected and exit data is automatically transmitted from the communicator to a remote processor. The entrance of the vehicle into the second zone is automatically detected, and entrance data from the communicator to the remote processor is automatically transmitted. The exit data and the entrance data each comprises a date and time stamp, a driver ID, a vehicle ID and a location signal.

DETAILED DESCRIPTION

With reference to the drawings wherein like numerals represent like parts throughout the several Figures, a locator system is employed to track personnel and vehicles at or in transit to and from various geographically spaced terminals. The locator system has particular applicability in conjunction with the tracking of personnel and vehicles such as, for example, may be employed in connection with vehicle leasing systems.

The locator system employs a personal communicator 100 which, along with numerous other similar communicators, are initially placed in a controlled access rack generally designated by the numeral 200. Upon proper authorization, a communicator 100 is unlocked and removed from the rack and placed on the user in a holster generally designated by the numeral 300. Each user in a preferred application is a vehicle driver who wears a holster.

Figure 4:
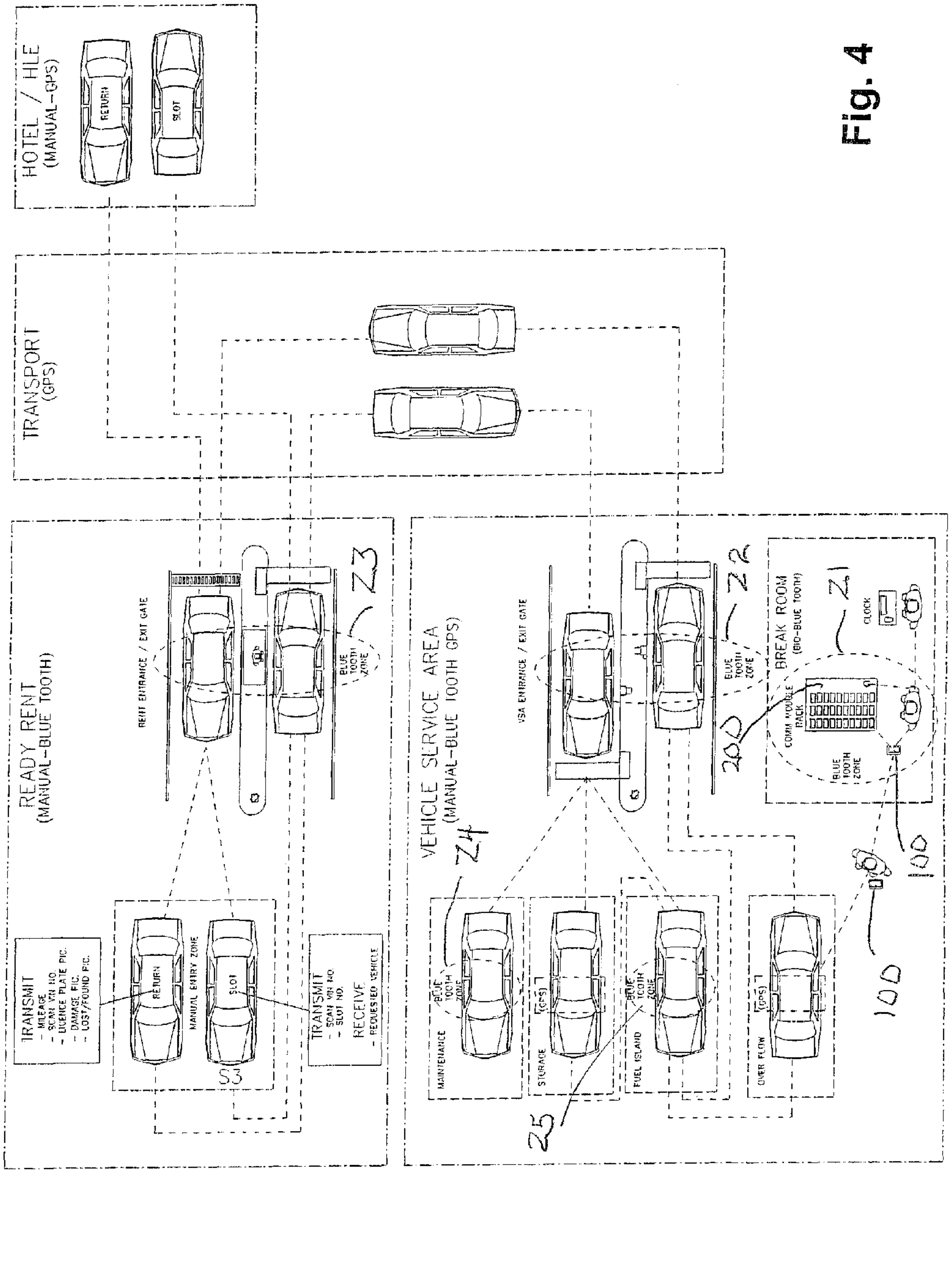
FIG. 4 is an annotated plan view, partly in schematic and partly in diagram, of various communication terminals in conjunction with vehicles and various zones illustrating an embodiment of a locator system.

The locator system is illustrated in FIG. 4 in connection with various zones Z1, Z2, Z3, Z4 and Z5. Each of the zones Z1, Z2, Z3, Z4 and Z5 has a Bluetooth transceiver which communicates with the communicator. The Bluetooth transceiver mounts to a terminal at each of the zones. The Bluetooth transceiver is preferably a low-powered transmitter/receiver which operates continuously to provide a 25-foot, 50-foot, 100-foot radius zone or other dimensioned low-power zone as required. The transceiver may be powered by solar power or by other means.

Figure 1:
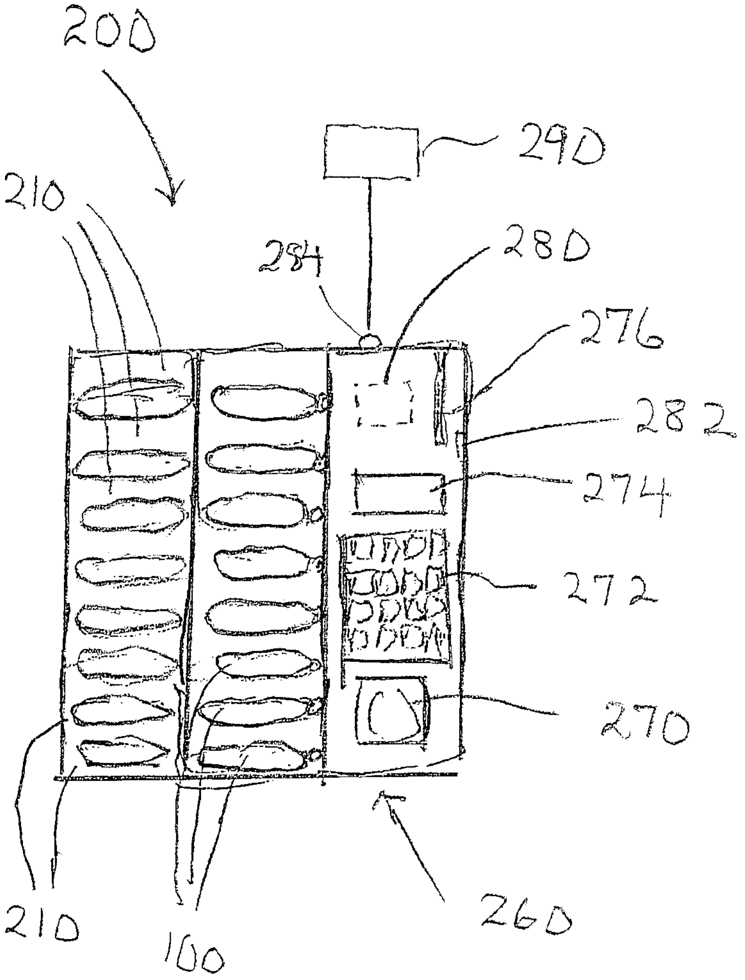
FIG. 1 is a frontal view, partly in schematic, of a controlled access storage rack.
Figure 2:
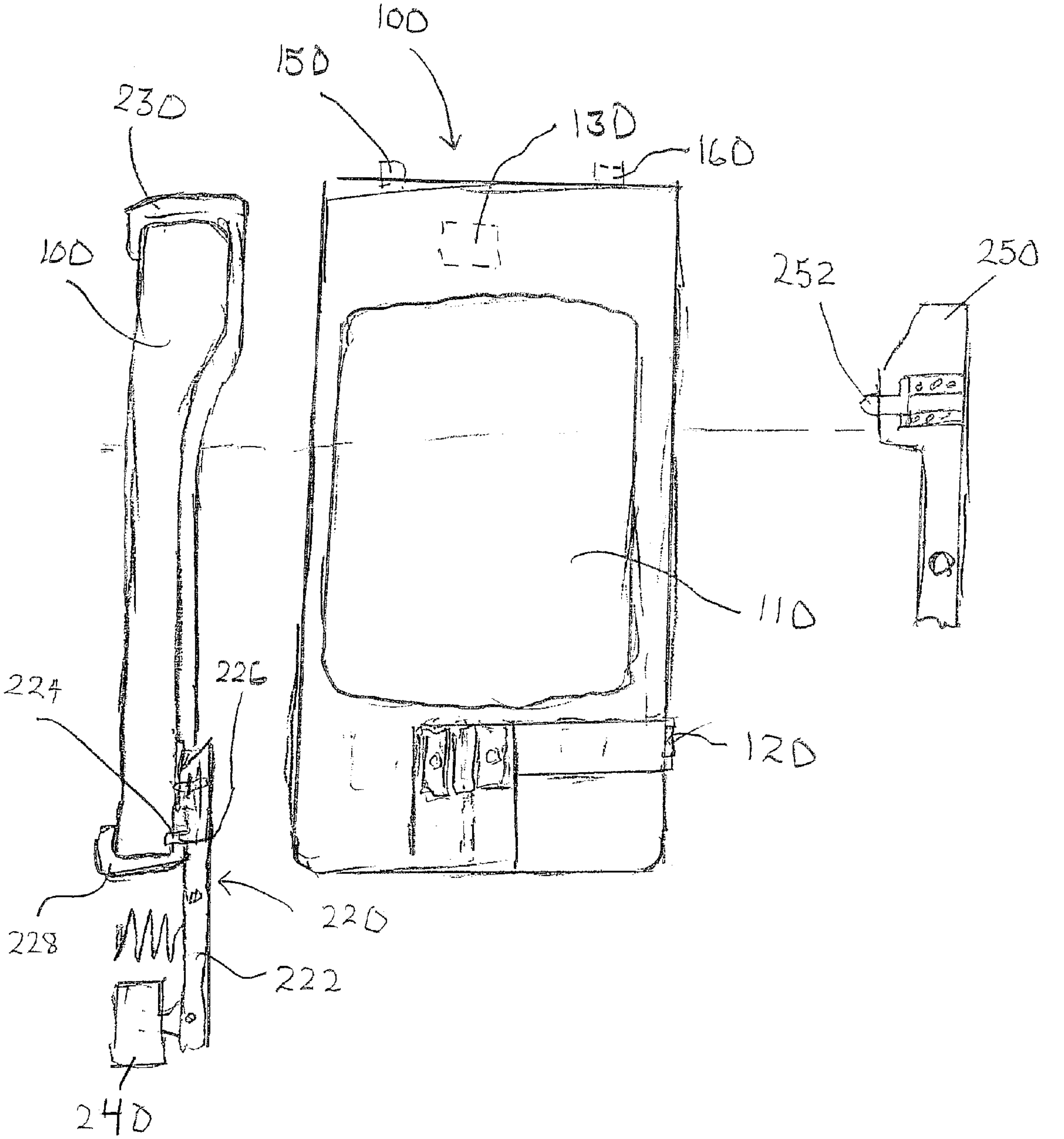
FIG. 2 schematically illustrates various views of a personal communicator and its lock and power engagement and communication connections with the storage rack of FIG. 1.

With reference to FIGS. 1 and 2, the electronic storage rack 200 preferably includes an array of slots 210 for receiving a communicator 100. Each communicator is secured by an electronic lock 220. In one embodiment, a lever arm 222 carries a locking pin 224 which is receivable in an aperture 226 of a generally U-shaped retainer bracket 228. The bracket 228 cooperates with an opposed clip 230 for retaining the communicator. The position of the lever arm 222 is controlled by a solenoid 240 for locking/releasing the communicator. Each communicator is also connected via a power connector 250 for charging while the communicator remains locked in the rack. The power connector 250 includes a spring loaded conductor 252 which engages a side power port of the communicator. Each communicator has a unique serial number.

The electronic lock 220 for each communicator 100 in the rack is controlled by a bio-dispenser module 260. The bio-dispenser module 260 includes a bio-reader 270, a keypad 272, a display screen 274 and a card reader 276. The bio-dispenser module also includes a Bluetooth transceiver 280 and a cell phone 282 and connects via port 284 with a LAN 290.

Preferably, the biometric sensor 270 confirms the identity of a valid user, which is typically the driver of a vehicle. Each electronic lock 220 controls the issuing of the communicator. The biometric sensor 270 processes the input in the form of an image of a print from the user. The image is processed and correlated with a user identification (ID) which may be entered at the keyboard 272. Upon verification, the control module electronically transmits the user ID to a communicator via Bluetooth communication. In addition, the user ID and communicator serial number are transmitted via SMS (short message service) communication to a host computer 10. When the communicator is removed from the rack by the user, a message is sent via SMS communication to the host computer. The rack essentially initially generates a Bluetooth detection zone via transceiver 280. In addition, the rack charges the batteries of each communicator as it is locked in place under controlled conditions at the rack. When the communicator is returned to the rack, an SMS communication is transmitted to the host computer identifying the communicator and the user ID.

The communicator 100 functions as a portable personal communication terminal. In one form, the communicator is an Android™-based cell phone which includes a screen 110 and a USB port 120, and has been modified with various applications, as will be described below.

Movement of the communicator 100 is detected by Bluetooth communication as the communicator travels from zone to zone. The communicator transmits via SMS communication to the host computer events which represent movement into or out of the Bluetooth communication zones.

The communicator 100 also preferably includes a camera 130. The communicator camera 130 is employed to read barcode and vehicle ID labels, to acquire an image of the vehicle, to record vehicle damage, and to record lost and found items which are located in the vehicle. The communicator has a GPS 150 which transmits the position of the communicator to the host computer 10. Data is transmitted via SMS communication to the host computer 10. With each transmittal from the communicator, a date and time stamp is also transmitted to and from the communicator. Supervisors or other individuals may transmit text messages to the communicator. In addition, the host computer 10 may transmit text messages to the communicator. The communicator also preferably includes an RFID reader 160 which reads and transmits vehicle identification.

Figure 3A:
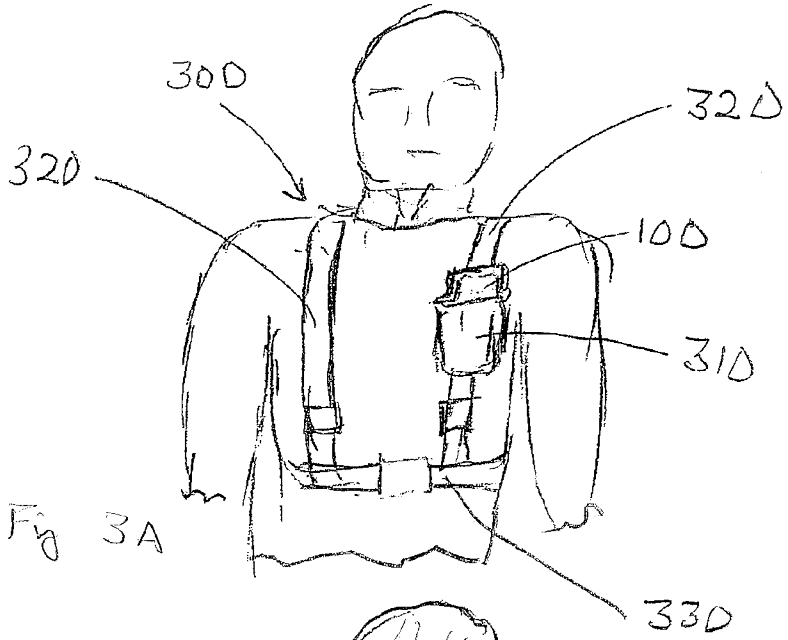
FIGS. 3A and 3B respectively illustrate front and rear views of a communicator holster with a communicator as worn by a user.
Figure 3B:
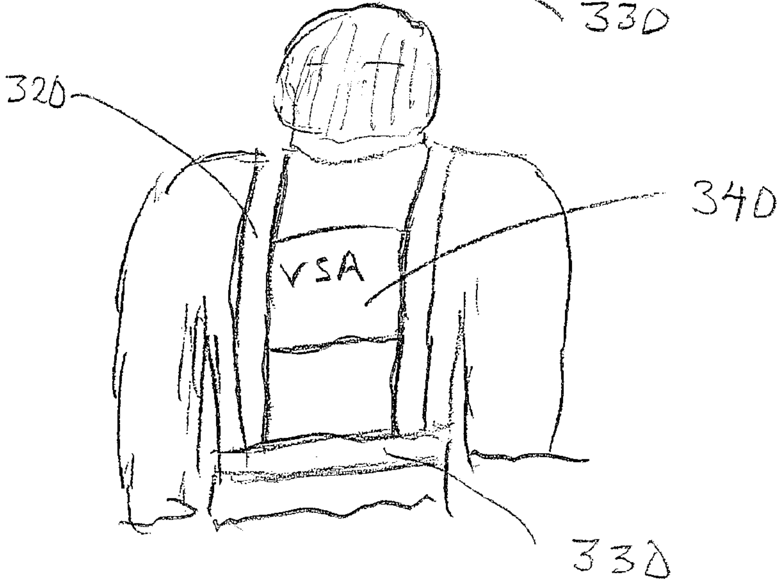

The holster 300 can assume a number of forms. With reference to FIGS. 3A and 3B, the holster preferably includes a pocket or receptacle 310 for receiving and securing the communicator 100. The holster is easily secured to and worn by the user or vehicle driver so that easy access is provided to the user for the communicator. Preferably, the holster is configured with adjustable straps 320 and an adjustable mounting belt 330 so that one size would essentially fit all users. The holster also preferably has a rear panel 340 which identifies the employee's affiliation—which is for a preferred application a vehicle leasing organization employee.

With respect to the flow diagrams of FIGS. 5-9, the following designations are applicable:

SMS=Simple Message Service
B.T. Zone=Bluetooth Zone
Sr. No.=Serial Number
D&T=Date and Time
CP=Cell Phone
LAN=Local Area Network
CM=Control Module
PTT=Personal Transaction Terminal (Communicator)

Figure 5:
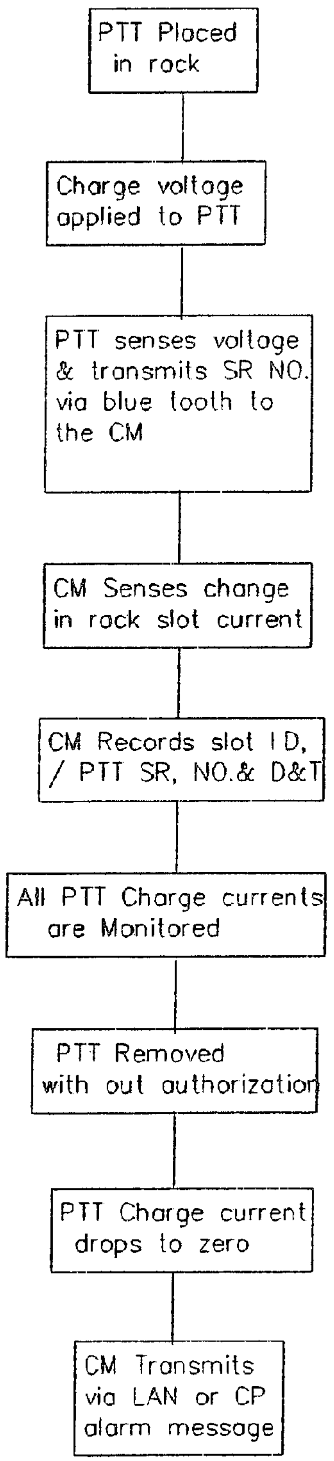
FIG. 5 is a flow diagram of a load sequence for the locator system.

With reference to FIG. 5, the personal communicator 100 or personal transaction terminal (PTT) is placed in the rack 200 and locked in position. A charge voltage is applied to the communicator. The communicator senses a voltage and transmits a serial number via Bluetooth communication to the control module. The control module senses a change in the rack/slot current. The control module then records a slot ID, the serial number, date and time for the communicator 100. The communicator charge currents are continuously monitored. When the communicator is removed without authorization, the PTT charge current drops to zero. The control module then transmits via a LAN 290 or cell phone 282 an "Alarm" message.

Figure 6:
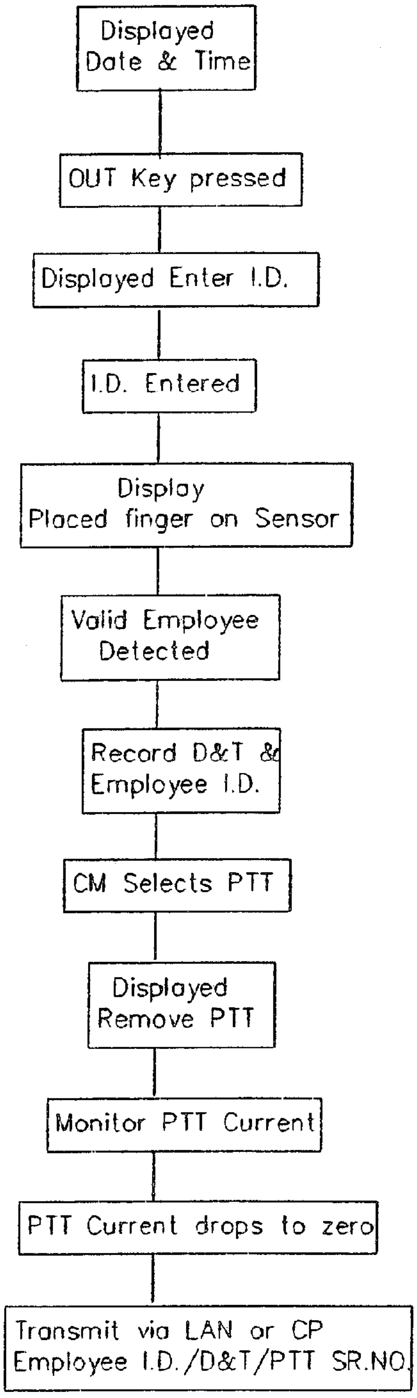
FIG. 6 is a flow diagram for an assignment sequence for the locator system.

An assignment sequence for assigning a user ID to the communicator is illustrated in FIG. 6. The date and time is displayed at the rack on screen 274. An OUT key on the keyboard 272 is pressed. A display for entering an ID of the user is activated on screen 274. The ID of the user is then entered. A display is activated to direct the user to place a finger on the biosensor 270. The valid identity of the user employee is essentially confirmed via the biosensor. The date, time and user ID are then recorded. The control module then selects the communicator primarily based on its charge status. The location of the selected communicator 100 is displayed on the screen 274. The user is directed to remove the selected communicator and the communicator is removed from the identified slot. The communicator current is monitored. Upon removal, the communicator current drops to zero. The employee ID, date, time and communicator serial number are transmitted via LAN 290 or a cell phone 282.

Figure 7:
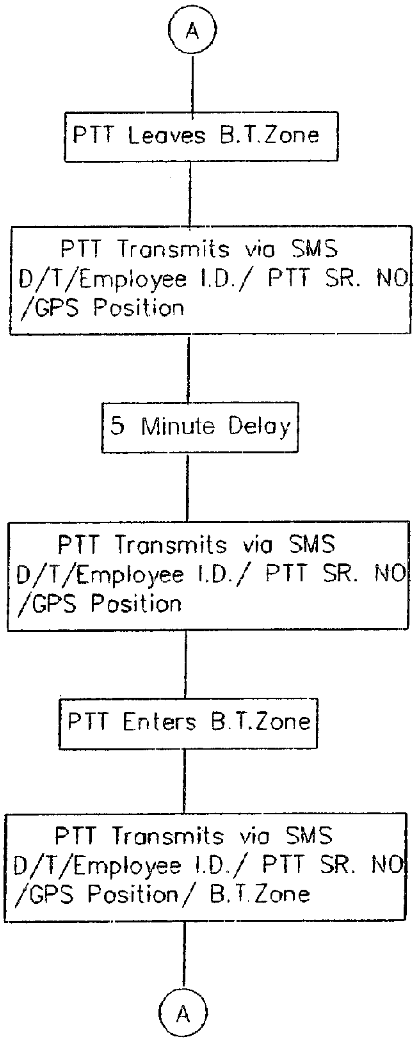
FIG. 7 is a flow diagram for a valid move sequence for the locator system.

A sequence for automatically electronically recording a valid move which can apply to any Bluetooth zone of a terminal including the Bluetooth zone defined by a rack is illustrated in FIG. 7. When the communicator 100 leaves the Bluetooth zone, the communicator transmits via SMS the date, time, employee ID, communicator serial number and GPS position of the communicator. After a five minute delay, the communicator 100 transmits via SMS the date, time, employer ID, communicator serial number and the GPS position. This is sequentially replicated continuously.

When the communicator 100 enters a Bluetooth zone, the communicator then transmits via SMS the date and time, the employer ID, the communicator serial number and the GPS position as well as the Bluetooth zone. When the communicator 100 leaves the Bluetooth zone, the same type of information is transmitted.

Figure 8:
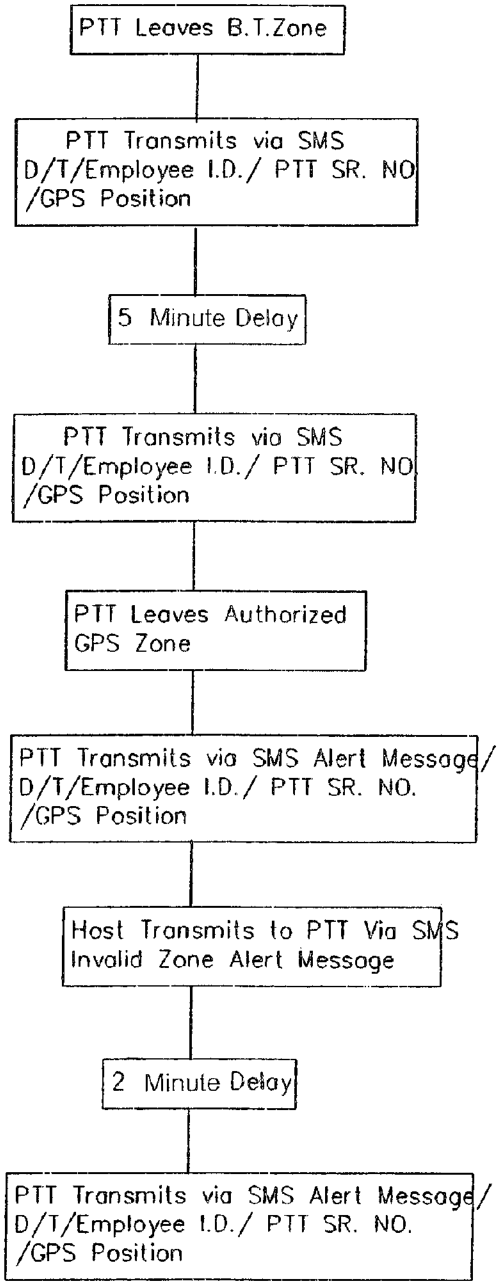
FIG. 8 is a flow diagram of an invalid move sequence for the locator system.

A sequence for an invalid move of the communicator 100 is illustrated in FIG. 8. When the communicator 100 leaves a Bluetooth zone, the Bluetooth transmits via SMS the date and time stamp, the employee ID, the communicator serial number and the GPS position. After a five minute delay, the communicator transmits via SMS the date and time stamp, the employee ID, the communicator serial number and the GPS position.

When the communicator 100 leaves an authorized GPS zone, the communicator transmits via SMS an alert message with the date and time stamp of the employee, the employee ID, the communicator serial number and the GPS position. The host then transmits to the communicator via SMS an "Invalid Zone" message alert. After a two minute delay, the communicator 100 transmits via SMS an "Alert" message the date and stamp of the employee, the employee ID, the communicator serial number and the GPS position to security.

Figure 9:
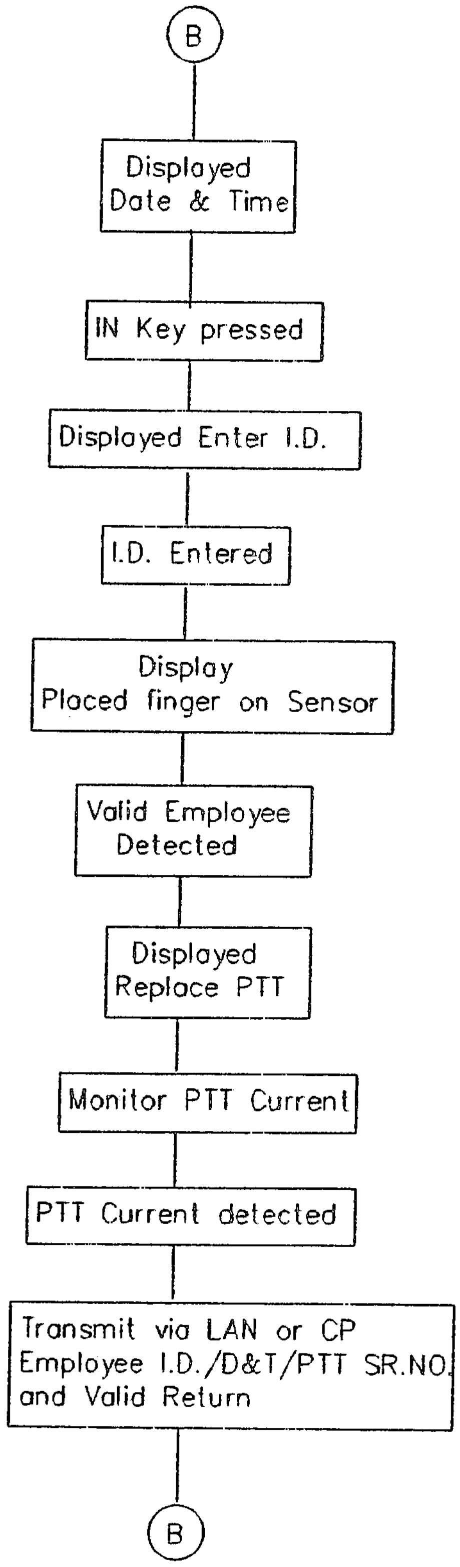
FIG. 9 is a flow diagram of a return sequence for the locator system.
Figure 10:
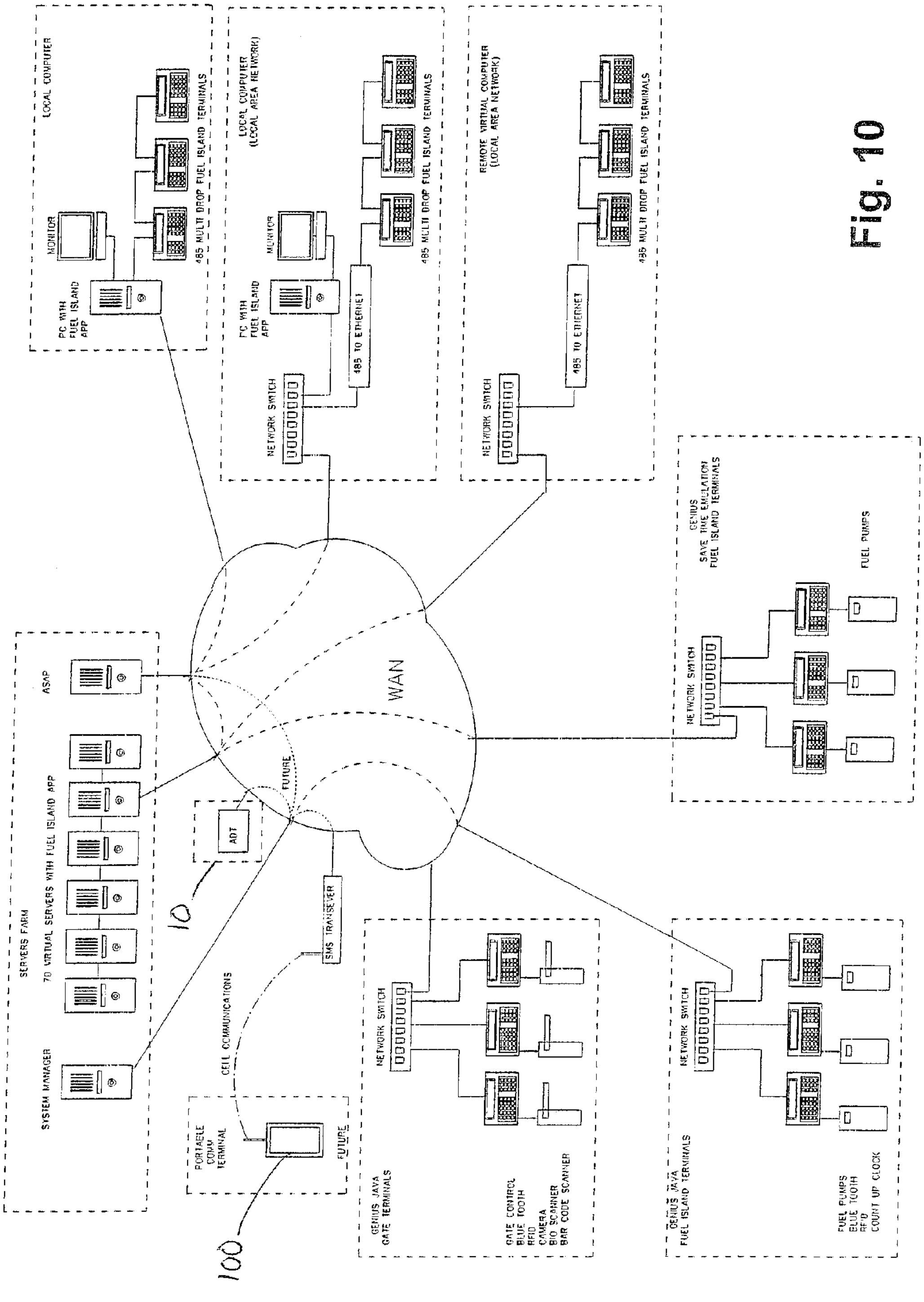
FIG. 10 is an annotated schematic view of an integrated communication system for the locator system for a representative application.

A communicator return sequence is illustrated in FIG. 9. The date and time is displayed. An IN key is pressed and a display is activated at the screen 274 for the user to enter an ID. The user's ID is entered on the keyboard 272 and a display on the screen 274 is activated to direct the user to place a finger on the sensor 270. A valid user employee is then confirmed. A display is activated to direct the user to replace the communicator. The communicator current is detected. A message of valid return is transmitted via LAN 290 or cell phone 282 with the employee ID, the date and time stamp and communicator serial number and a "Valid Return" message.

It will be appreciated that the foregoing locator system provides a highly efficient and versatile system for monitoring and locating the driver of a vehicle. The communicator 100 worn by the user will automatically electronically send date and time stamps and identified location information via SMS text messages to a host computer. Upon entry and exit of a Bluetooth zone, the GPS in the communicator tracks the vehicle every few minutes. For example, when the vehicle enters an exit gate at the airport at, for example Z2, a message is sent back to the host computer 10.

The locator system can be employed to determine the time spent by the driver and hence the vehicle in a single zone, such as a fuel island zone Z5. The entrance and exit relative to the zone Z5 automatically result in the communicator 100 automatically electronically sending data and time stamps, driver ID, vehicle ID and the GPS position to a remote host computer. The time within the zone can then be relatively easily computed and correlated with the driver, the vehicle and the activity.

The locator system can be employed with multiple zones as illustrated in FIG. 4. The transit to and from the lease facility and a hotel may be monitored by the locator system. For instance, the transit time may be calculated by a remote processor.

The communicator may also display text messages on its screen 110 which tell the user which vehicle to pick up. Upon picking up the vehicle, the camera 130 may be employed to read in the vehicle ID via the bar code reader, read the license plate. The camera 130 may be employed to record dent or scratches on the vehicle as well as lost or found articles within the vehicles equipped with RFID tags may be identified by reading the tag with the RFID reader.

In the event that the communicator 100 is lost or stolen, the host computer and security are notified. The unit may be located using the GPS location or detected as the unit enters or exits a Bluetooth zone.

The invention claimed is:

1. A method of monitoring the location of a driver and a vehicle comprising:

- providing controlled access to a rack of personal electronic communicators;
- entering a driver ID;
- confirming the validity of the driver ID;
- entering the driver ID on a selected communicator;
- removing the selected communicator from the rack;
- placing the communicator in a holster worn by the driver;
- using the communicator to identify a vehicle to be driven by the driver;
- driving the vehicle from a first zone to a second zone;
- detecting the exit from said first zone and automatically transmitting exit data from said communicator to a processor;
- detecting the entrance to said second zone and automatically transmitting entrance data from said communicator to said processor; and
- processing said exit data and entrance data to determine transit time of said vehicle from said first zone to said second zone.

2. The method of claim 1 wherein each of said first and second zones is defined by Bluetooth signals.

3. The method of claim 1 wherein said communicator further comprises a GPS and further comprising automatically transmitting signals from said communicator indicative of the location of said vehicle.

4. The method of claim 1 further comprising automatically sequentially transmitting location signals at pre-established time intervals.

5. The method of claim 1 wherein said exit data and said entrance data each comprises a date and time stamp, a driver ID and a vehicle ID.

6. The method of claim 1 further comprising entering the print of a driver in a bioreader to confirm authorization for said driver.

7. The method of claim 1 further comprising detecting the exit of the vehicle from said second zone and automatically transmitting second zone exit data from said communicator to said processor to determine the time said vehicle is in said second zone.

8. The method of claim 1 further comprising transmitting SMS messages to said communicator.

9. The method of claim 1 wherein the step of transmitting exit data and entrance data from said communicator is undertaken by SMS communication.

10. The method of claim 1 further comprising returning said selected communicator to a rack and automatically transmitting information concerning the return of the selected communicator to said rack.

11. The method of claim 1 wherein said communicator further comprises a GPS and further comprising automatically transmitting location signals indicative of the location of said vehicle from said communicator to said remote processor.

12. The method of claim 11 wherein said exit data and said entrance data each comprises a date and time stamp, a driver ID, a vehicle ID and a location signal.

13. A method of monitoring the location of a driver and a vehicle comprising:

selecting a personal electronic communicator from a plurality of personal electronic communicators which are individually secured to prevent removal;

entering a driver ID on the selected communicator;

releasing the selected communicator for removal and usage by the driver;

using the selected communicator to identify a vehicle to be driven by the driver;

driving the vehicle from a first zone to a second zone while the driver has the selected communicator;

automatically detecting the exit of the vehicle from said first zone and automatically transmitting exit data from said communicator to a remote processor;

automatically detecting the entrance of the vehicle into said second zone and automatically transmitting entrance data from said communicator to said remote processor; and processing the entrance data and the exit data to determine the time interval of said vehicle between said first zone and said second zone.

14. The method of claim 13 wherein each of said first and second zones is defined by Bluetooth signals.

15. The method of claim 13 wherein said selected communicator further comprises a GPS and further comprising automatically transmitting location signals from said selected communicator indicative of the location of said vehicle.

16. The method of claim 15 further comprising sequentially transmitting location signals at pre-established time intervals.

17. The method of claim 16 wherein said exit data and said entrance data each comprise a date and time stamp, a driver ID, a vehicle ID and a location signal.

18. A method of monitoring the location of a driver and a vehicle comprising:

entering a driver ID on a communicator;

releasing the communicator for usage by the driver;

using the communicator to identify a vehicle to be driven by the driver;

attaching the communicator to the driver;

driving the vehicle to enter a first zone while the communicator is attached to the driver;

automatically detecting the entrance of the vehicle into said first zone and automatically transmitting entrance data from the communicator to a remote processor;

driving the vehicle to exit said zone while the communicator is attached to the driver; and automatically detecting the exit from said zone and automatically transmitting exit data from said communicator to said remote processor; and processing said entrance data and said exit data to determine the time interval of said vehicle in said zone.

19. The method of claim 13 further comprising securing each communicator by an electronic lock.

20. The method of claim 13 further comprising confirming the identity of the driver by usage of a bio-metric sensor.

21. The method of claim 13 further comprising charging the personal electronic communicators while they are secured to prevent removal.

22. The method of claim 18 further comprising confirming the validity of the driver ID by use of a bio-sensor.

* * * * *